Patented Oct. 7, 1941

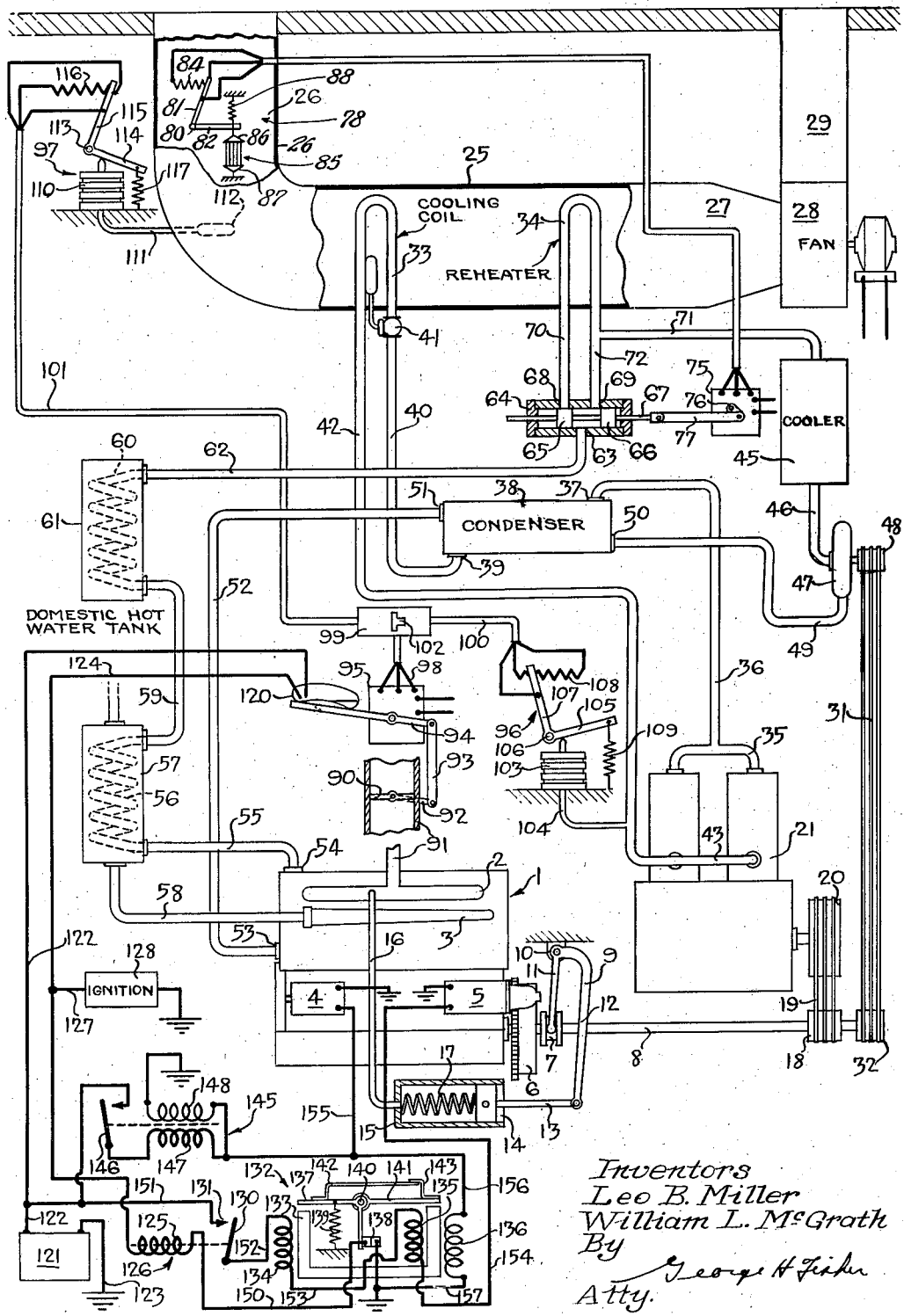

2,257,975

UNITED STATES PATENT OFFICE 2,257,975

AIR CONDITIONING SYSTEM

Leo B. Miller, Hartsdale, N. Y., and William L. McGrath, St. Paul, Minn., assignors to Minneapolis-Honeywell Regulator Company, Minneapolis, Minn., a corporation of Delaware Application July 16, 1937, Serial No. 154,024

12 Claims. (Cl. 257—3)

This invention relates to air conditioning, and is more particularly concerned with automatic controls therefor.

The primary object of our invention is to provide a simple and dependable arrangement for automatically controlling an air conditioning system of the type which is powered by means of an internal combustion engine, such control arrangement acting to progressively vary the output of the engine in accordance with the air conditioning load.

A further object of our invention is the inclusion in the control arrangement of a means for automatically starting and stopping the internal combustion engine, such means acting to cause starting of the engine whenever the conditioning load is sufficient to permit efficient operation of the system, and for stopping the engine whenever the conditioning load becomes so light that inefficient operation of the system would result.

Another object of our invention is the provision of a novel and efficient system for providing heated fluid, such as domestic hot water, the system employing the internal combustion engine as a source of heat, thus utilizing the heat from the engine which would be otherwise wasted.

A further object is the inclusion in the heat collecting or recovering system above mentioned, of the condenser for the refrigeration system, thereby cooling the condenser, recovering the heat given off by the condenser, and employing such heat for a useful purpose.

A still further object is the utilizing of this heat recovery system as a source of heat for reheating the conditioned air whenever such reheat is necessary.

More specifically, it is an object of our invention to provide a heat recovery system in which heat exchange fluid is passed serially through the condenser, in heat exchange relationship with the engine cylinders, and finally in heat exchange relationship with the exhaust gases, the fluid thus heated being then utilized directly, or for heating other medium such as domestic hot water.

Further objects will appear from the following detailed description and the appended claims. For a full disclosure of our invention reference is made to the following description taken in connection with the accompanying drawing, the single figure of which illustrates diagrammatically one form of our invention.

Reference character 1 indicates generally an internal combustion engine, this engine being provided with the usual intake manifold 2, an exhaust manifold 3, an electric generator 4, and a starting motor 5. Reference character 6 indicates a fly-wheel for the engine 1, this fly-wheel being provided with the usual ring gear adapted for engagement with the starting motor mechanism, and also containing the usual clutch assembly as well known in the art. Reference character 7 indicates a clutch collar which is arranged to actuate the clutch assembly located within the fly-wheel 6, this being arranged to cause the clutch to be disengaged when moved along the shaft 8 away from the fly-wheel 6 and to cause engagement of the clutch when moved along said shaft towards the fly-wheel, this arrangement being well known in the art. For actuating the clutch collar 7, a bell crank lever 9 is provided, this lever being pivoted at 10 and having fingers 11 engaging the clutch collar 7, and having also an actuating arm 12 which is pivotally secured at its lower end to a piston rod 13. The piston rod 13 is attached to a piston 14 operating within a cylinder 15. The interior of the cylinder 15 is connected by means of a pipe 16 to the intake manifold 2. Located within the cylinder 15 is a compression spring 17, this spring being arranged to urge the piston 14 outwardly, thereby tending to rotate the bell crank lever 9 in a counter-clockwise direction, this causing the clutch collar 7 to disengage the clutch. This action occurs when atmospheric pressure exists in the intake manifold 2. Therefore, when the engine is not running the clutch mechanism just described will cause the clutch to be disengaged. When the engine is started, however, a sub-atmospheric pressure will occur in the intake manifold, this causing reduction in pressure within the cylinder 15, which in turn results in the piston 14 being moved to the left, overcoming the action of spring 17 and causing engagement of the clutch. It should now be apparent that when the engine is not in operation the clutch will be disengaged, and that after the engine is started, the clutch will be automatically engaged.

Attached to the shaft 8 is a pulley 18, this pulley cooperating with a plurality of belts 19 to drive a larger pulley 20 which is attached to the shaft of the compressor 21. In this manner the engine 1 acts to drive the compressor 21.

Reference character 25 indicates generally an air conditioning chamber, this chamber being connected at its inlet end to a duct 26 which leads from the space to be conditioned. The discharge end 27 of the conditioning chamber 25 is connected to a fan 28, which in turn is connected by a discharge duct 29 with the space to be conditioned. Located in the conditioning chamber 25 is a cooling coil 33 and also a reheating coil 34 located downstream of the cooling coil.

Reference character 35 indicates a discharge manifold for the compressor 21, this discharge manifold being connected by a conduit 36 to the refrigerant inlet 37 of the condenser 38. The refrigerant outlet 39 of the condenser 38 is connected by means of a conduit 40 to an expansion valve 41, this expansion valve being connected in turn to the inlet of the cooling coil 33. The outlet of the cooling coil 33 is connected by means of a conduit 42 to the intake manifold 43 of the compressor 21. The compressor 21, condenser 38, expansion valve 41 and cooling coil 33 thus form an ordinary compression refrigeration system, the operation of which is well known to those skilled in the art and hence will not be described here, other than to state that operation of the compressor will cause chilling of the cooling coil.

Reference character 45 indicates a water cooler of any suitable type, such, for instance, as an evaporative cooler or a spray pond. Cooled water is withdrawn from the cooler 45 by means of an outlet conduit 46, this conduit being connected to the intake of a suitable pump 47. The pump 47 is herein shown as provided with a pulley 48 over which run the belts 31, these belts running also over a driving pulley 32 which is mounted on shaft 8. The discharge of pump 47 is connected to a conduit 49, this conduit leading to the cooling water inlet 50 of the condenser 38. The cooling water outlet 51 of condenser 38 is connected by means of a conduit 52 to the inlet 53 of the water jacket of the engine 1. The outlet 54 of the water jacket is connected by means of a conduit 55 to the heat exchange coil 56 which is located within the heat exchanger 57. The space in heat exchanger 57 surrounding the coil 56 is connected to the exhaust pipe 58 of the internal combustion engine, this exhaust pipe being connected to the exhaust manifold 3. The upper end of said coil 56 is connected by means of a conduit 59 to a heating coil 60 which may be located in the domestic hot water tank 61. Leading from the upper end of the heating coil 60 is a conduit 62 which is connected to the inlet 63 of the three-way valve 64. The three-way valve 64 may be of any suitable construction and is herein illustrated as comprising the balanced piston type, having piston valve members 65 and 66 mounted upon an operating shaft 67. The piston valve 65 is arranged to cooperate with a valve port 68 while the piston valve 66 is arranged to cooperate with a similar valve port 69. With the operating shaft 67 in the position shown, the valve member 65 covers the valve port 68 and the valve port 69 is completely uncovered, thus permitting a flow of water from the inlet 63 through the valve port 69. As the operating shaft 67 is shifted to the left, the valve member 66 will gradually cover the port 69, and at the same time the valve member 65 will gradually uncover the valve port 68. It should be apparent from the foregoing that by shifting the operating shaft 67, either the valve port 68 or 69 may be completely covered, or both ports may be partially uncovered, thus permitting control of the relative quantities of water passed through ports 68 and 69. The valve port 68 is connected by means of conduit 70 to the inlet of the reheating coil 34, the outlet of this reheating coil being connected to a pipe 71 which leads to the inlet of the cooler 45. The valve port 69, however, is connected directly to the pipe 71 by means of pipe 72. The three-way valve 64 therefore acts to control the flow of hot water through the reheating coil 34.

The operating shaft 67 of the three-way valve 64 is positioned by means of a proportioning motor 75, this motor having an operating lever 76 to which is attached a link 77 which in turn is pivotally connected to the operating shaft 67. It will be apparent that as the actuating lever 76 of the proportioning motor is rotated, the operating shaft 67 of the three-way valve will be shifted. The proportioning motor 75 may be of any suitable type and is herein shown as being of the type illustrated in Patent No. 1,989,972 issued to Lewis L. Cunningham on May 22, 1935. This type of proportioning motor is adapted to be controlled by means of a potentiometer and is arranged to cause its operating lever to assume angular positions corresponding to the position of the potentiometer slider upon the potentiometer coil. For controlling the proportioning motor 75 a potentiometer type of space relative humidity controller 78 is illustrated.

Humidity controller 78 comprises a bell crank member 80 having a control arm 81 and an actuating arm 82. The control arm 81 cooperates with a resistance 84 for forming a control potentiometer for controlling the proportioning motor 75. For varying the position of the control arm 81 on the resistance 84 in accordance with changes in relative humidity of the air in the space, the actuating arm 82 is connected to a humidity responsive device 85, this device comprising a plurality of strands of hair or other moisture responsive material, these strands being clamped at their upper and lower ends to suitable clamping members 86 and 87. The upper clamping member 86 is connected to the actuating arm 82 while the lower clamping member 87 is connected to a suitable stationary element. For urging the control arm upwardly to stress the strands of moisture responsive material, a tension spring 88 is provided, this tension spring being connected to the end of actuating arm 82 and to any suitable stationary element. It will be understood that the humidity controller 78 may be located in the conditioned space or if desired it may be located in the return air duct 26. Upon increase in humidity the strands of moisture responsive material will increase in length, this permitting the spring 88 to urge the actuating arm 82 upwardly thereby causing movement of the control arm 81 to the left across the control resistance 84. Upon decrease in humidity the opposite action will take place, namely, the strands 85 will decrease in length thereby causing movement of the control arm 81 to the right against the action of the tension spring 88.

With the control arm 81 in the position shown the space relative humidity is low as indicated by the control arm 81 engaging the extreme right hand end of the control resistance 84. For this position of the control arm 81 the proportioning motor 75 has assumed a position in which the three-way valve causes all of the water to by-pass the reheater 34. The reheater 34 for this value of humidity is therefore out of operation. If now should the space relative humidity increase, the control arm 81 will be shifted to the left across the resistance 84 and the proportioning motor 75 will follow up such movement in a direction to close off the port 69 and open the port 68 thereby permitting part of the heated water to flow through the reheater 34. It will be apparent that as the humidity increases, the three-way valve will be positioned to increase the proportion of the heated water passed through reheater 34, and when the relative humidity has increased to such an extent that the control arm 81 engages the extreme left end of control resistance 84, all of the water will be passed through the reheater 34.

From the foregoing description it should be apparent that cold water is drawn from the cooler 45 and first discharged into the condenser 38 for absorbing heat from the gaseous refrigerant in said condenser, thereby causing such refrigerant to be liquefied. The thus heated water is then passed through the water jacket of the engine in which it picks up further heat and is finally passed in heat exchange relationship with the exhaust gases, thus becoming highly heated. This highly heated water is then utilized for heating domestic water, this causing it to be reduced in temperature. In spite of this reduction in temperature caused by the heating of the domestic hot water, the heated water after leaving the domestic hot water heat exchanger will nevertheless still be of sufficient temperature for reheating purposes due to the fact that the temperature of the air passing over the reheater is relatively low. While for illustrative purposes, the reheater is indicated as receiving its heating water from the outlet of the heating coil in the domestic hot water tank, it will be apparent that any other suitable arrangement may be employed. For instance, the reheater and domestic hot water heating coil may be connected in parallel if desired, or they may receive their heat by separate fluid circulating systems. While we have illustrated a cooling device for cooling the water before re-passing it to the condenser, it will be apparent that if desired, the water leaving the reheater may be run to waste and fresh water supplied continuously for cooling the condenser.

In order to control the speed and hence the output of the engine 1 a throttle valve 90 is provided, this valve being located in the fuel supply line 91 leading to the intake manifold 2. To the throttle valve 90 is secured an actuating lever 92 which is connected to a link 93, this link being attached to the operating lever 94 of the proportioning motor 95. The proportioning motor 95 may also be of the type shown and described in the Cunningham patent hereinbefore referred to. This proportioning motor 95 may be controlled either by means of a potentiometer suction pressure controller 96 or by means of a space temperature responsive controller 97. For illustrative purposes the control leads 98 of the proportioning motor are shown as being connected to a triple pole double throw switch 99, one side of this switch being connected to the controller 96 by means of control leads 100, the other side of this switch being connected by means of control leads 101 to the controller 97. The switch 99 is provided with an operating lever 102. When this lever is positioned as shown, the controller 96 is disconnected from the proportioning motor 98 and the controller 97 is placed in full control of said proportioning motor. Conversely, when the position of operating lever 102 is reversed, the controller 97 will be disconnected from the proportioning motor 95 and the suction pressure controller 96 will be placed in full control thereof.

The suction pressure controller 96 consists of a bellows 103 which is connected to the suction line 42 by means of a pipe 104. The upper end of bellows 103 is attached to a suitable stud which cooperates with the actuating arm 105 of bell crank lever 106, this bell crank lever having a control arm 107 arranged to engage the control resistance 108. The actuating arm 105 is connected to a tension spring 109, the lower end of which is attached to a suitable fixed support, this tension spring acting to urge said actuating arm against the bellows 103. Upon an increase in suction pressure, the bellows 103 will expand against the action of spring 109, this causing movement of the control arm 107 to the left across the control resistance 108. Upon a decrease in suction pressure, however, the bellows 103 will contract under the action of spring 109, this causing the control arm 107 to travel to the right across control resistance 108. If the selector switch 99 is positioned to place the controller 96 in control of the proportioning motor the angular position of the operating lever 94 of said proportioning motor will depend upon the position of control arm 107 on control resistance 108. When the suction pressure is below a predetermined value the control arm 107 will engage the extreme right end of control resistance 108, this causing the proportioning motor to assume the position shown in which the throttle valve 90 is completely closed. As the suction pressure rises above this value, however, the control arm 107 will travel to the left across the control resistance 108 this resulting in the proportioning motor following up such movement, thereby causing opening of the throttle valve 90. From the foregoing it should be apparent that when the suction pressure is sufficiently low, the controller 96 will cause complete closing of the throttle valve 90. If the suction pressure increases, however, the throttle valve will be opened, and the degree of opening will increase as the suction pressure increases.

The controller 97 may either be of the room type or return duct type and is illustrated as being of the latter type. This controller may comprise a bellows 110 which is connected by a tube 111 to a control bulb 112 located in the path of the return air. The bellows, tube, and bulb contain a suitable volatile fluid wherefore the vapor pressure within the bellows 110 will vary in accordance with return air temperature. Bellows 110 acts to position bell crank lever 113, having an actuating arm 114 and a control arm 115, said control arm being arranged to cooperate with a control resistance 116. Urging the control arm 114 against the bellows 110 is a tension spring 117. Upon an increase in return air temperature the bellows 110 will expand against the action of spring 117, this causing movement of the control arm 115 to the left across control resistance 116. Upon fall in return air temperature, however, the bellows 110 will contract under the action of spring 117, this causing movement of control arm 115 in the opposite direction. The controller 97 is designed and adjusted so that when the return air temperature is below 75° F. the control arm 115 will engage the extreme right-hand end of control resistance 116. As the return air temperature increases above this value the control arm 115 will travel to the left across control resistance 116, and when the return air temperature rises to 82° F. said control arm will engage the extreme left-hand end of control resistance 116. If the selector switch 99 is positioned to place the controller 97 in control of the proportioning motor 95, the operating lever 94 of said proportioning motor will follow up movements of the control arm 115 on the control resistance 116. Thus when the return air temperature is below 75° F. the proportioning motor will assume a position in which the throttle valve 90 is completely closed. As the return air temperature rises, movement of control arm 115 as previously described will occur, this causing the proportioning motor 95 to cause opening of throttle valve 90, the degree of opening of said throttle valve being dependent upon the return air temperature.

Mounted upon an extension of the operating shaft 94 of the proportioning motor 95 is a mercury switch 120. This mercury switch is arranged to be tilted to open position whenever the throttle valve 90 is closed to such an extent that the resulting slow operation of the engine would be undesirable. When the throttle valve 90 is positioned so as to cause desirable operation of the engine, the mercury switch 120 will be tilted to closed position. The function of this mercury switch is to cause starting of the engine when tilted to closed position and to cause stopping of the engine when tilted to open position. This operation is accomplished by the automatic starting system which will now be described.

Reference character 121 indicates a suitable storage battery, one lead of this battery being connected by means of wire 122 to the mercury switch 120 and being connected by a wire 123 to a suitable ground connection. The other terminal of the mercury switch 120 is connected to a wire 124, this wire leading to one end of relay coil 125 of the magnetic starter 126 for the starting motor 5. The wire 124 is also connected by wire 127 to the ignition coil 128, the other terminal of which is secured to a suitable ground connection. The magnetic starter 126 includes a switch arm 130 cooperating with a contact 131. When coil 125 is energized the switch arm 130 is pulled into engagement with contact 131. Upon deenergization of coil 125, however, the switch arm 130 will be caused to disengage from contact 131 by means of gravity, springs, or other means, not shown. Energization of the relay coil 125 is also controlled by means of a relay mechanism generally indicated as 132. Relay mechanism 132 comprises a U-shaped core 133, a current coil 134 being wound around the left-hand leg thereof and a similar current coil 135 being wound around the right-hand leg thereof. Also wound upon the right-hand leg of the core 133 is a voltage coil 136. Cooperating with the left-hand leg of core 133 is an armature 137, this armature being formed as a bell crank carrying a contact 138, this contact being arranged to cooperate with the cooperating contact shown. A tension spring 139 tends to urge the armature 137 in a counter-clockwise direction, thereby tending to urge contact 138 against its cooperating contact. The bell crank shaped armature 137 is pivoted upon a shaft 140, and to this same shaft is freely pivoted an armature 141 which cooperates with the right-hand leg of the core 133. To the armature 137 is secured a leaf spring 142, this spring cooperating with a clip 143 mounted upon the armature 141. With the coils 134, 135 and 136 deenergized the spring 139 will act to urge the armature 137 downwardly, thereby urging the contact 138 into engagement with its cooperating contact. When, however, the current coils 134 and 135 are energized, the armatures 137 and 141 will be pulled downwardly. The downward movement of the armature 141 will result in the free end of leaf spring 142 being pulled downwardly, this creating a force opposing the action of spring 139, which force is of sufficient magnitude to overcome the action of spring 139. However, at this time the armature 137 will be held downwardly by the magnetic action of the core 133 and hence the contact 138 will remain engaged with its cooperating contact. When the current flow in coils 134 and 135 is materially reduced, however, the holding effect of core 133 upon armature 137 will be reduced a much greater extent than the holding effect of said core upon the armature 141 due to the fact that the air gap between said core and the armature 137 is much greater than the air gap between said core and the armature 141. This will permit the leaf spring 142 to cause clockwise rotation of armature 137, thereby disengaging contact 138 from its cooperating contact.

Reference character 145 indicates a reverse current relay, this relay being provided for the purpose of disconnecting the generator 4 from the storage battery 121 whenever said generator is not operating. When, however, the generator operates sufficiently for charging of the battery, the relay 145 will connect said generator to the storage battery. Reverse current relays of this type are well known in the art and hence relay 145 is not described herein in detail, other than to state that said relay comprises a switch arm 146, a current coil 147 and a voltage coil 148, one end of said voltage coil being grounded.

When mercury switch 120 closes due to the throttle valve being opened to the minimum operating position for the engine, the ignition coil 128 will be energized by a circuit as follows: storage battery 121, wire 122, mercury switch 120, wire 124, wire 127, ignition coil 128 to ground. At the same time the relay coil 125 will be energized by the following circuit: storage battery 121, wire 122, mercury switch 120, wire 124, relay coil 125, wire 150, contact 138 and its cooperating contact to ground. The energization of the relay coil 125 will cause the switch arm 130 to engage the contact 131 this causing a circuit to be completed through the starting motor 5 as follows: storage battery 121, wire 122, wire 151, contact 131, switch arm 130, wire 152, current coil 134, wire 153, current coil 135, wire 154 and starting motor 5 to ground. This will cause operation of the starting motor to start the engine and will simultaneously energize the current coils 134 and 135, this, in the manner previously described, urging the armatures 137 and 141 downwardly. When the internal combustion engine starts, the starting motor 5 will draw but a small fraction of the current drawn by said motor while cranking the engine. This reduction in current flow through the current coils 134 and 135 will result in the armature 137 being raised upwardly by the leaf spring 142, thereby disengaging the contact 138 from its cooperating contact and deenergizing the relay coil 125, this in turn breaking the energizing circuit for the starting motor. When the engine 1 starts, the generator 4 will be placed into operation and the generator cut-out 145 will be pulled in, thereby connecting the generator with the storage battery for charging said storage battery. Also the coil 136 of the relay mechanism 132 will be energized by the following circuit: generator 4, wire 155, wire 156, coil 136 and wire 157 to ground. So long as the engine is in operation the generator 4 will maintain the current coil 136 energized, this holding the armature 141 downwardly thereby maintaining the contact 138 out of engagement with its cooperating contact, thus preventing the starting motor 5 from being energized so long as the engine is in operation. The internal combustion engine 1 will remain in operation as long as the throttle valve 90 is open sufficiently to cause the mercury switch 120 to be closed. When the throttle valve 90 is closed to such an extent that mercury switch 120 opens, the energizing circuit for the ignition coil will be broken and the engine 1 will be automatically placed out of operation. It should be noted that mercury switch 120 is of the curved type. This is for providing a wide differential between the angular positions for making and breaking of said switch. By providing this differential between making and breaking operation, short cycling of the apparatus is prevented. Thus, when the switch is tilted to closed position, the engine will start, and due to the resulting operation of the compressor the suction pressure will be reduced. If the proportioning motor 95 is under the control of the suction pressure controller, the operating arm in response to the aforementioned decrease in pressure will be moved slightly in a direction to close the throttle valve and to tilt the mercury switch towards breaking position. Due to the wide differential, however, the switch will remain closed, and hence the apparatus will remain in operation. It will be apparent that if the motor 95 is controlled by other conditions than suction pressure, a wide differential type of switch will not be necessary. No novelty is claimed for the specific arrangement of the starting relays 132 and 125, this arrangement being shown and described in the Loehr et al. Patent No. 1,773,913 dated August 26, 1930.

Operation

If it is desired to control the system in accordance with room or return air temperature, the suction pressure controller 96 may be omitted as by operating switch 102 to place the return air temperature controller 97 in control of the proportioning motor 95. Assuming that controller 97 is in control of the proportioning motor 95; with the parts in the position shown, the return air temperature is low as indicated by control arm 115 engaging the extreme right end of control resistance 116. Hence, the entire system is out of operation. If now should the return air temperature increase to a point where cooling is needed, the bellows 110 will expand, this causing the control arm 115 to travel to the left across control resistance 116, this, in turn, resulting in a follow-up movement by the proportioning motor 95 to open the throttling valve 90 an extent corresponding to the movement of control arm 115. When the return air temperature has risen sufficiently to require operation of the engine 1 at an efficient operating speed, the actuating arm 94 of said motor will be tilted sufficiently to cause mercury switch 120 to make contact, which will result in starting of the engine 1 in the manner hereinbefore described. When the engine starts and comes up to speed, the automatic clutching mechanism will connect the drive shaft 8 to the shaft of the engine, this resulting in driving of the compressor 21 and the water circulating pump 47. Operation of the compressor will cause a flow of liquid refrigerant into the cooling coil 33 and will withdraw therefrom the evaporated refrigerant, thereby causing chilling of the cooling coil 33, this, in turn, cooling the air passing thereover to effect a cooling of the space being conditioned. Operation of the pump 48 will cause a flow of water first through the condenser for condensing the gaseous refrigerant, this cooling water then passing through the engine jacket, and finally through the exhaust gas heat exchange 57. Due to this cooling the condenser, the engine and the exhaust gases, the circulating water will pick up considerable heat which is available for heating domestic water in the tank 61. Hence, the heated circulating water by being passed through the coil 60 of the heat exchanger 61 will provide a supply of hot water for domestic or other purposes, this supply of hot water being derived from heat which would ordinarily be wasted. The water after passing through the coil 60 passes through the three-way valve 64 to the pipe 71 and to the cooler 45 from which it is repassed through the circuit just described, this cycle being repeated continuously. If the return air temperature should continue to increase, the control arm 115 of the controller 97 will move further to the left, this resulting in proportioning motor 95 further opening the throttling valve 90 to increase the speed of engine 1. This increase in speed will increase the output of the compressor, thereby causing the temperature of the cooling coil 33 to be lowered still further, which results in it absorbing more heat from the air passing thereover. Conversely, upon a fall in temperature, the opposite action will take place, that is, the speed of the engine will be reduced proportionately with the fall in temperature, and in this manner the space temperature will be maintained within the desired limits. When the return air temperature has fallen to such an extent as to indicate that the cooling load is so light as to require the engine to operate so slowly as to be inefficient the mercury switch 120 will break, this causing the engine 1 to stop, thereby placing the system out of operation. Therefore, by the use of the engine control system hereinbefore described, the engine speed is modulated within predetermined limits in a manner to maintain proper temperature conditions in the space, and whenever the cooling load is so light as to normally require only a very small output of the engine, the engine is stopped in order to avoid inefficient operation.

In the event that the space relative humidity should become excessive, the humidity controller 78 will act to cause positioning of the three-way valve in a manner to allow all or a part of the heated water to pass through the reheater 34 depending upon the degree of excessiveness. This supplying of heated water to the reheater 34 will result in heat being imparted to the air passed to the conditioned space and this will result in a rise in temperature within said space. In response to this temperature rise, the temperature controller 97 will act to cause an increase in speed of the internal combustion engine. This in turn will increase the speed of the compressor thereby lowering the pressure within the cooling coil 33 which results in the cooling coil becoming colder. This lowering in temperature of the cooling coil will cause it to condense more moisture and therefore the dehumidifying effect of said cooling coil will be increased to cause a reduction in relative humidity within the conditioned space. The control system will therefore act to maintain the temperature and humidity conditions within predetermined limits.

If it is desired to control the system in accordance with the suction pressure of the system instead of by space or return air temperature, the suction pressure controller 96 will be utilized. In such event, the controller 97 may be omitted from this system as by operating switch 102 to place the suction pressure controller 96 in control of the proportioning motor 95. By this arrangement, when the suction pressure increases, the throttling valve will open further to increase the speed of the engine, this increase in engine speed causing the output of the compressor to be increased, thereby preventing further increase in suction pressure. Similarly, should the suction pressure decrease, the speed of the engine will be correspondingly decreased in a manner to maintain the suction pressure within predetermined limits. By this arrangement, the output of the engine will be varied in accordance with the temperature of the air passing over the cooling coil 33. Thus, if the temperature should rise, an increased amount of refrigerant will be evaporated within the cooling coil 33, this resulting in an increase in suction pressure which, in turn, results in an increase in speed of the engine 1 in order to meet this increase in cooling load. Conversely, if the temperature of the air passing over the cooling coil decreases, there will be a reduction in the quantity of refrigerant evaporated in the cooling coil 33, this resulting in a reduction in suction pressure which causes the controller 96 to reduce the speed of the engine correspondingly. Hence, by controlling in accordance with suction pressure, the speed of the engine will be varied in accordance with the cooling load. It will be apparent that the operation of the automatic starting and stopping system for the engine will be the same whether the engine is controlled by space temperature or by suction pressure. In other words, with the suction pressure controller, whenever the suction pressure is reduced to a point indicating that the cooling load is light, the mercury switch 120 will break, thus placing the engine out of operation to avoid inefficient operation thereof which would otherwise result.

While we have illustrated the humidity controller 78 for controlling the flow of heated fluid to the reheater it will be understood that this disclosure is for illustrative purposes only, and if desired, any suitable type of reheater control arrangement may be used depending upon the particular control sequence desired. For instance, if desired the reheater may be controlled by the discharge duct temperature for preventing the temperature of the air being delivered to the space from falling below a predetermined value, or it may be controlled in accordance with space temperature.

From the foregoing, it should be seen that we have provided an automatic control arrangement for an internal combustion engine driven refrigeration system, this control arrangement acting to proportionately increase the speed of the engine as the need for refrigeration increases, and acting also to start the engine only when the demand for refrigeration is high enough to justify operation of the engine, the engine being placed out of operation whenever the demand for refrigeration falls so that an inefficient operation of the system would otherwise result. It should also be apparent that we have provided a novel means for recovering heat which would normally be wasted, our system acting to cool the condenser, the engine and the exhaust gases in an efficient manner so as to recover substantially all of the waste heat.

It will be understood that our invention is not limited to cooling of air, and that certain phases of our invention may be utilized for heating systems, or for all-year air conditioning systems.

While we have shown and described a preferred form of our invention, many modifications which are within the scope of our invention will be apparent to those skilled in the art. We therefore desire to be limited only by the scope of the appended claims and the prior art.

We claim as our invention:

1. In a system of the class described, comprising, in combination, a heat exchange device for changing the heat content of the air in a space to be conditioned, means for supplying heat exchange fluid to said heat exchange device including an internal combustion engine, a controller for varying the output of said internal combustion engine, a controller for starting and stopping said engine, motor means for variably positioning said first controller and for moving said second controller from one position to another, said motor means being arranged to cause said second controller to be moved to stopping position when said first controller is moved to a predetermined minimum output position, and to move said second controller to starting position when said first controller is moved a predetermined extent from said position, and means influenced by the heat content of the condition of air for controlling said motor means, said last mentioned means and said motor means being arranged to progressively increase the engine output with increase in the conditioning load and to progressively decrease the engine output with decrease in conditioning load.

2. In a system of the class described, comprising, in combination, a heat exchange device for changing the heat content of the air in a space to be conditioned, means for supplying heat exchange fluid to said heat exchange device including an internal combustion engine, a controller for varying the output of said internal combustion engine, means responsive to a load condition for actuating said controller to effect modulation of the engine speed in accordance with said load condition, means for stopping said internal combustion engine, and means actuated when the engine output is lowered to a predetermined minimum value for actuating said stopping means to cause stopping of said engine.

3. In a system of the class described, comprising, in combination, a heat exchange device for changing the heat content of the air in a space to be conditioned, means for supplying heat exchange fluid to said heat exchange device including an internal combustion engine, a controller for varying the output of said internal combustion engine, means responsive to a load condition for actuating said controller to effect modulation of the engine speed in accordance with said load condition, means for starting said internal combustion engine, and means actuated when said controller is moved to a position requiring engine output above a predetermined minimum value for actuating said starting means.

4. In a refrigeration system, in combination, a compressor, an internal combustion engine for driving said compressor, a controller for varying the speed of said internal combustion engine, means responsive to a load condition for actuating said controller to effect modulation of the compressor speed in accordance with the said load condition, means for stopping said internal combustion engine, and means actuated when the internal combustion engine speed is lowered to a predetermined minimum value for actuating said stopping means to cause stopping of said compressor.

5. In a refrigeration system, in combination, a cooling device, means for supplying a cooling medium to said cooling device including an internal combustion engine, a controller for varying the output of said internal combustion engine, motor means for variably positioning said controller, cooling load responsive means for controlling the position assumed by said motor means ot thereby effect modulation of the engine output in accordance with the cooling load, and means actuated when the engine output is reduced to a predetermined minimum value for discontinuing the modulation of engine output and for stopping said engine.

6. In a refrigeration system, in combination, a cooling device, means for supplying a cooling medium to said cooling device including an internal combustion engine, a controller for varying the output of said internal combustion engine, motor means for variably positioning said controller, cooling load responsive means for controlling the position assumed by said motor means to thereby effect modulation of the engine output in accordance with the cooling load, means for starting said internal combustion engine, and means actuated when said controller is moved to a position requiring engine output above a predetermined minimum value for actuating said starting means.

7. In an air conditioning system, in combination, a cooling device, means for passing air in heat exchange relationship with said cooling device and to a space to be conditioned, means for supplying a cooling medium to said cooling device including a mechanical refrigeration system, a compressor for said system, an internal combustion engine for driving said compressor, a controller for varying the speed of said internal combustion engine, means responsive to the cooling effectiveness of said cooling medium for actuating said speed controller to thereby vary the compressor speed in accordance with such condition, and means actuated when the compressor speed is reduced to a predetermined value for stopping said internal combustion engine.

8. In a system of the class described, comprising, in combination, a heat exchange device, means for supplying heat exchange fluid to said heat exchange device including a compressor, a controller for varying the output of said compressor, motor means for variably positioning said controller, heat exchange load responsive means for controlling the position assumed by said motor means to thereby effect modulation of the compressor output in accordance with the heat exchange load, and means actuated when said compressor output is reduced to a predetermined low value for discontinuing the modulating control of said compressor and placing it out of operation.

9. In a system of the class described, an evaporator, a compressor for reducing the pressure within said evaporator and for supplying refrigerant thereto, an internal combustion engine for driving said compressor, a controller for said internal combustion engine for varying the speed thereof and consequently varying the output of said compressor, motor means for variably positioning said controller, a load responsive device in control of said motor means for causing said motor means to assume positions varying with the load for modulating the compressor output in a manner to carry the existing load, and means actuated by said motor means for starting and stopping said internal combustion engine, said last named means being arranged to cause starting of the engine when the controller is positioned to a predetermined minimum operation position, and for causing stopping of said engine when the controller is positioned to cause engine operation below said predetermined minimum.

10. In an air conditioning system, in combination, means for cooling and dehumidifying air in a space being conditioned, a reheater for reheating the air, means for actuating said cooling and dehumidifying means comprising a mechanical refrigeration system having a compressor, an internal combustion engine for driving said compressor, means for collecting waste heat from said engine and supplying it to said reheater, reheat control means for controlling said reheater, a speed controller for said internal combustion engine, space temperature responsive means for actuating said speed controller in a manner to increase the engine speed upon increase in space temperature, and means responsive to the humidity in said space for actuating said reheat control means in a manner to increase the amount of reheat upon increase in humidity.

11. In an air conditioning system, in combination, means for cooling and dehumidifying air in a space being conditioned, a reheater for reheating the air, means for actuating said cooling and dehumidifying means comprising a mechanical refrigeration system having a compressor, an internal combustion engine for driving said compressor, means for collecting waste heat from said engine and supplying it to said reheater, reheat control means for controlling said reheater, a speed controller for said internal combustion engine, a switch for starting and stopping said internal combustion engine, space temperature responsive means for controlling said speed controller and said switch in a manner to actuate said switch for starting said engine and then increase the engine speed as space temperature rises from a low value to a higher value, and means responsive to the humidity in said space for actuating said reheat control means in a manner to increase the amount of reheat upon increase in humidity.

12. In an air conditioning system, in combination, means for cooling and dehumidifying air in a space being conditioned, a reheater for reheating the air, means for actuating said cooling and dehumidifying means comprising a mechanical refrigeration system having a compressor, an internal combustion engine for driving said compressor, means for collecting waste heat from said engine and supplying it to said reheater, reheat control means for controlling said reheater, a speed controller for said internal combustion engine, space temperature responsive means, space humidity responsive means, one of said responsive means controlling said speed controller and the other of said responsive means controlling said reheat control means.

LEO B. MILLER.
WILLIAM L. McGRATH.